United States Patent [19]

Mauro

[11] Patent Number: 5,077,620

[45] Date of Patent: Dec. 31, 1991

[54] MOTORIZED OPTICAL COMPONENT POSITIONING STAGE

[76] Inventor: George Mauro, 18 Simpson Rd., Windham, N.H. 03087

[21] Appl. No.: 533,799

[22] Filed: Jun. 6, 1990

[51] Int. Cl.⁵ .................. G02B 21/26; G02B 21/01
[52] U.S. Cl. .................... 359/393; 359/391; 359/398
[58] Field of Search .............. 350/529–536, 350/247, 319, 321; 356/244; 269/43–46, 50–51, 55–61, 71–76, 308–320; 250/428, 442.1; 108/20–21, 59–65, 137, 143; 248/415–419, 317, 320

[56] References Cited

U.S. PATENT DOCUMENTS

| | | | |
|---|---|---|---|
| 3,701,199 | 10/1972 | Lewis | 356/138 |
| 4,142,798 | 3/1979 | Barbee, Jr. | 356/138 |
| 4,170,404 | 10/1979 | Meye et al. | 350/321 |
| 4,189,953 | 2/1980 | Volk | 350/531 |
| 4,557,568 | 12/1985 | Van Benschoten | 350/531 |
| 4,573,566 | 3/1986 | Roman | 269/61 |
| 4,652,095 | 3/1987 | Mauro | 350/531 |
| 4,833,382 | 5/1989 | Gibbs | 350/535 |
| 4,966,350 | 10/1990 | Chick | 269/43 |

Primary Examiner—Scott J. Sugarman
Assistant Examiner—Thong Nguyen
Attorney, Agent, or Firm—John M. Brandt

[57] ABSTRACT

An optical positioning stage arranged for the precise movement of light optical components or the like composed of a pair of plates having rail receiving grooves, a pair of rails joining the plates and attached thereto by an adhesive, and a work piece mounting table slideably disposed between the rails and the plates, and an electric motor assembly consisting of a motor, a speed reducing gear train and an encoder all mounted on an additional plate positioned between the rails and operationally connected to the work piece table.

3 Claims, 1 Drawing Sheet

MOTORIZED OPTICAL COMPONENT POSITIONING STAGE

BACKGROUND OF THE INVENTION

1. Field of the Invention

The invention resides in the field of adjustable work piece mounting devices and more particularly relates to motor driven precise positioning stages for optical components.

2. Description of the Prior Art

A precision positioning stage of the type relating to the invention is disclosed in U.S. Pat. No. 4,652,095 issued to the applicant. The device described therein employs an adhesive assembly concept for a stage utilizing two end plates having grooves for receiving a pair of rails and a work table slideably disposed between the plates.

The present invention is an improvement thereon wherein an electrical motor, gear system, and encoder are mounted on an additional plate also disposed between the rails and wherein the motor is operationally connected to the work table by, for example, a threaded rod such that the table is moved by actuation of the motor.

SUMMARY OF THE INVENTION

The invention may be summarized as an improvement in a work piece positioning stage of the type described above by the addition of a motor assembly for driving the work piece mounting table which assembly consists of an electric motor, a speed reducing gear train and an encoder to sense the fractional revolutions of the motor. The motor assembly is mounted on a plate which straddles the rails similarly to the two end supporting plates and is either free to move along the rails or is fixed.

The motor assembly of the invention allows a degree of miniaturization not heretofore obtainable in that any mechanical actuating mechanism such as an external motorized micrometer is completely eliminated from the device. Instead an encoder which senses the number of revolutions of the motor is used to control the actuation or deactivation of the motor and correspondingly the amount of travel of the work piece table.

Power is transmitted to the motor through an appropriate circuitry which counts the number of steps of the encoder and discontinues the power when the selected amount of travel or position has been achieved. With proper a calibration, keyboard control modules may be used to select or command desired positions and the transport function automatically carried out.

As the motor may be arranged to travel with the work piece mounting table, the bulk and limitations of a separate motor package previously required for the same purpose is eliminated. The simplicity thus achieved results in a more reliable and inexpensive assembly than is currently obtainable possible within the existing prior art.

The advantages and features of the invention will be more fully understood from the description of the preferred embodiment and drawings which follows.

DESCRIPTION OF THE PREFERRED EMBODIMENT

Figure 1:
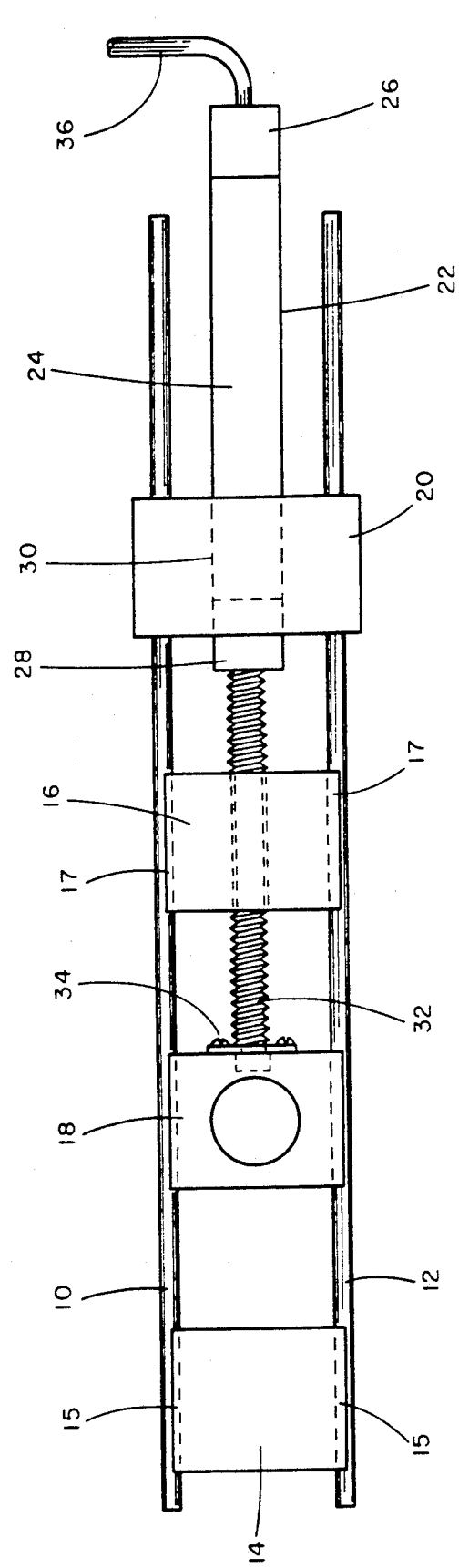
FIG. 1 is a plan view of the preferred embodiment of the invention.

Referring first to FIG. 1, a stage comprising the preferred embodiment is illustrated in which rails 10 and 12 are spaced apart by, and adhesively attached to end plates 14 and 16 in grooves 15 and 17 respectively. Work piece mounting table 18 is slideably disposed between rails 10 and 12. Motor assembly mounting plate 20 is similarly slideably disposed between rails 10 and 12 on the opposite side of end plate 16 from mounting table 18.

Motor assembly 22 consisting of electric motor 24, motor revolution sensing encoder 26 and speed reducing gear train 28 is mounted through plate 20 in hole 30 and may be secured by an adhesive or by mechanical clamp means not shown.

Threaded rod 32 driven by motor assembly 22 is threaded through plate 16 and is rotationally secured to work piece table 18 by, for example, split ring clamp 34 or other means as would be obvious to those skilled in the art.

As will now be seen, table 18 and motor assembly 22 travel together upon activation of the motor causing rotation of threaded rod 32 in plate 16. Since the rod is supported at three spaced apart points, i.e. table 18, plate 16, and mount 20, relatively great distances of travel may be achieved by increasing the length of the rails and extending the distance between plates 14 and 16.

Cable 36 connects assembly 22 to electrical power and control circuitry wherein the output of the encoder is translated into the distance traveled by table 18. Actual measurements depend upon the physical parameters of the system constructed in accordance with the invention. Motor assembly units and control components of the type suitable for employment in the invention are available from for example Micro Mo Electronics Inc., St. Petersburg, Fla. 33701.

Figure 2:
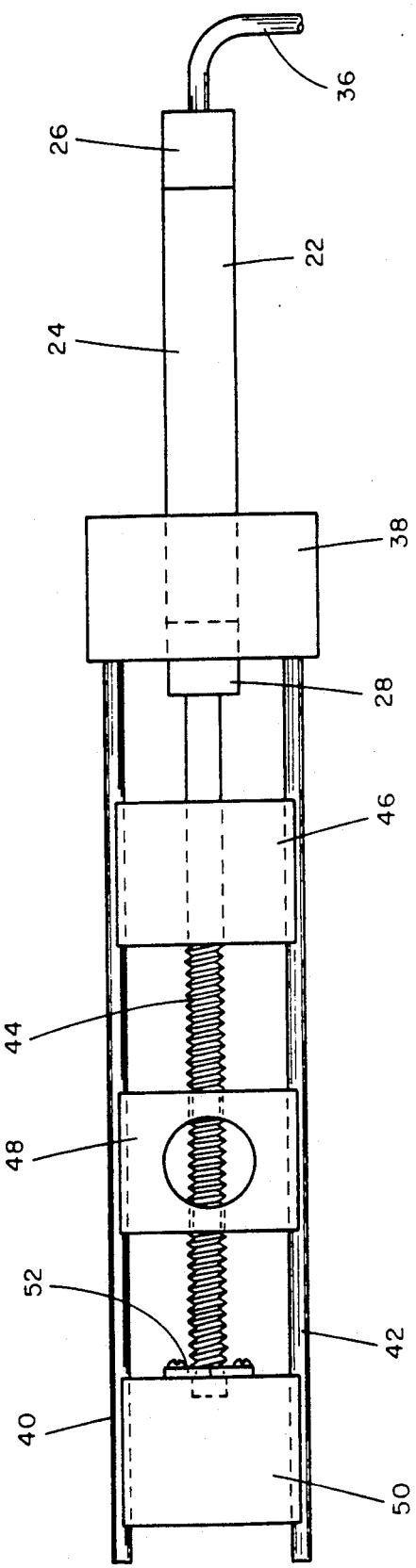
FIG. 2 is a plan view of an alternative embodiment of the invention.

Referring next to FIG. 2 an alternative embodiment of the invention is shown wherein the same basic structure of rails and end plates is used but a fixed motor assembly mounting plate 38 is attached to rails 40 and 42. Partially threaded rod 44 extends through end plate 46, is threadably engaged with work piece table 48 and is rotationally connected to end plate 50 by clamp 52. As will be seen, rotation of the motor in this embodiment moves table 48 between end plates 46 and 50 using the same combination of gear train 28, motor 24, encoder 26 and cable 36 described above.

Modifications of the device specifically disclosed herein will now be apparent to those skilled in the art. Accordingly, the invention is hereby defined by the following claims.

What is claimed is:

1. In an optical positioning stage comprising in combination:
   a. a first end plate having a parallel opposed first pair of grooves disposed therein;
   b. a second end plate spaced a selected distance from said first plate, said second plate having a parallel opposed second pair of grooves disposed therein, said grooves spaced apart a distance equivalent to the distance between said first pair of grooves;
   c. a pair of rails, one each disposed in one of said first and one of said second pairs of grooves and adhesively attached to the surfaces of said first and second pairs of grooves; and d. a work piece mounting table slideably disposed between said end plates and said rails, the improvement which comprises:
  i. a mounting plate disposed between said rails spaced a selected distance from said second plate;
  ii. a motor assembly mounted on said mounting plate between said rails, said assembly comprising:
    aa. an electric motor;
    bb. speed reducing gear means driven by said motor for reducing the output speed of said motor assembly; and
    cc. an encoder for sensing the revolutions of said motor; and
  iii. a threaded rod operationally connected between said gear means and said work piece mounting table whereby the rotation of said motor effects the lateral movement of said table.

2. The apparatus of claim 1 wherein said mounting plate is secured to said rails.

3. The apparatus of claim 1 wherein said mounting plate is slideably mounted on said rails and said threaded rod is rotatably secured to said first end plate.

* * * * *